United States Patent
Raman et al.

(10) Patent No.: US 11,086,848 B1
(45) Date of Patent: Aug. 10, 2021

(54) DYNAMIC DATA TRANSFORMATION SYSTEM

(71) Applicant: Bank of America Corporation, Charlotte, NC (US)

(72) Inventors: Sundarrajan Raman, Tamil Nadu (IN); Ankita Jain, Charlotte, NC (US); Prasad Dasari, Charlotte, NC (US); Siva Chaitanya Thurlapati Venkata, Telengana (IN); Igor Yago, Dublin (IE); Oscar Lopez-Martinez, Kildare (IE); Ramamurthy Pavan Nallamothu, Andhra Pradesh (IN); Padmanabham Ponnada, Charlotte, NC (US); Jeff L. Howard, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 17 days.

(21) Appl. No.: 16/787,579

(22) Filed: Feb. 11, 2020

(51) Int. Cl.
*G06F 17/00* (2019.01)
*G06F 16/23* (2019.01)
*G06F 16/28* (2019.01)

(52) U.S. Cl.
CPC ........ *G06F 16/2365* (2019.01); *G06F 16/284* (2019.01)

(58) Field of Classification Search
CPC .......... G06F 16/11; G06F 16/13; G06F 16/24; G06F 16/156; G06N 3/00; G06N 5/00; G05B 13/00
See application file for complete search history.

(56) References Cited

U.S. PATENT DOCUMENTS

| 7,139,999 | B2 | 11/2006 | Bowman-Amuah |
| 8,321,438 | B1 | 11/2012 | Smith et al. |
| 8,949,175 | B2 | 2/2015 | Wu et al. |
| 9,201,638 | B2 | 12/2015 | Ravi et al. |
| 9,348,879 | B2 | 5/2016 | Mohammad et al. |
| 9,384,231 | B2 | 7/2016 | Benjamin et al. |
| 9,514,203 | B2 | 12/2016 | Mohammad et al. |
| 10,815,545 | B2 * | 10/2020 | Kwon ................. C23C 8/80 |
| 2010/0114628 | A1 * | 5/2010 | Adler ............. G06Q 10/063 705/7.11 |

(Continued)

*Primary Examiner* — Hung D Le
(74) *Attorney, Agent, or Firm* — Banner & Witcoff, Ltd.; Michael A. Springs

(57) ABSTRACT

Systems for dynamically transforming data are provided. Database data may be received and ingested into a system. Ingesting the data may include executing one or more first data governance functions, such as data quality evaluation functions, data controls, and the like. The ingested data may then be output for further processing as first processed data and first data governance information may be captured and stored. The first processed data may be processed to execute one or more data transformations. Data transformations may include calculations, formatting, derivations, and the like. In some arrangements, second data governance functions may be executed on the transformed data. The transformed data may then be output as second processed data. The system may capture second data governance information as the data is transformed. The second processed data may then be published to one or more downstream databases for use in one or more applications executed by an entity.

21 Claims, 11 Drawing Sheets

(56) References Cited

U.S. PATENT DOCUMENTS

| | | | |
|---|---|---|---|
| 2011/0066602 A1* | 3/2011 | Studer | G06F 16/248 |
| | | | 707/690 |
| 2011/0320460 A1* | 12/2011 | Fankhauser | G06Q 10/10 |
| | | | 707/748 |
| 2015/0012478 A1* | 1/2015 | Mohammad | G06F 16/254 |
| | | | 707/602 |

* cited by examiner

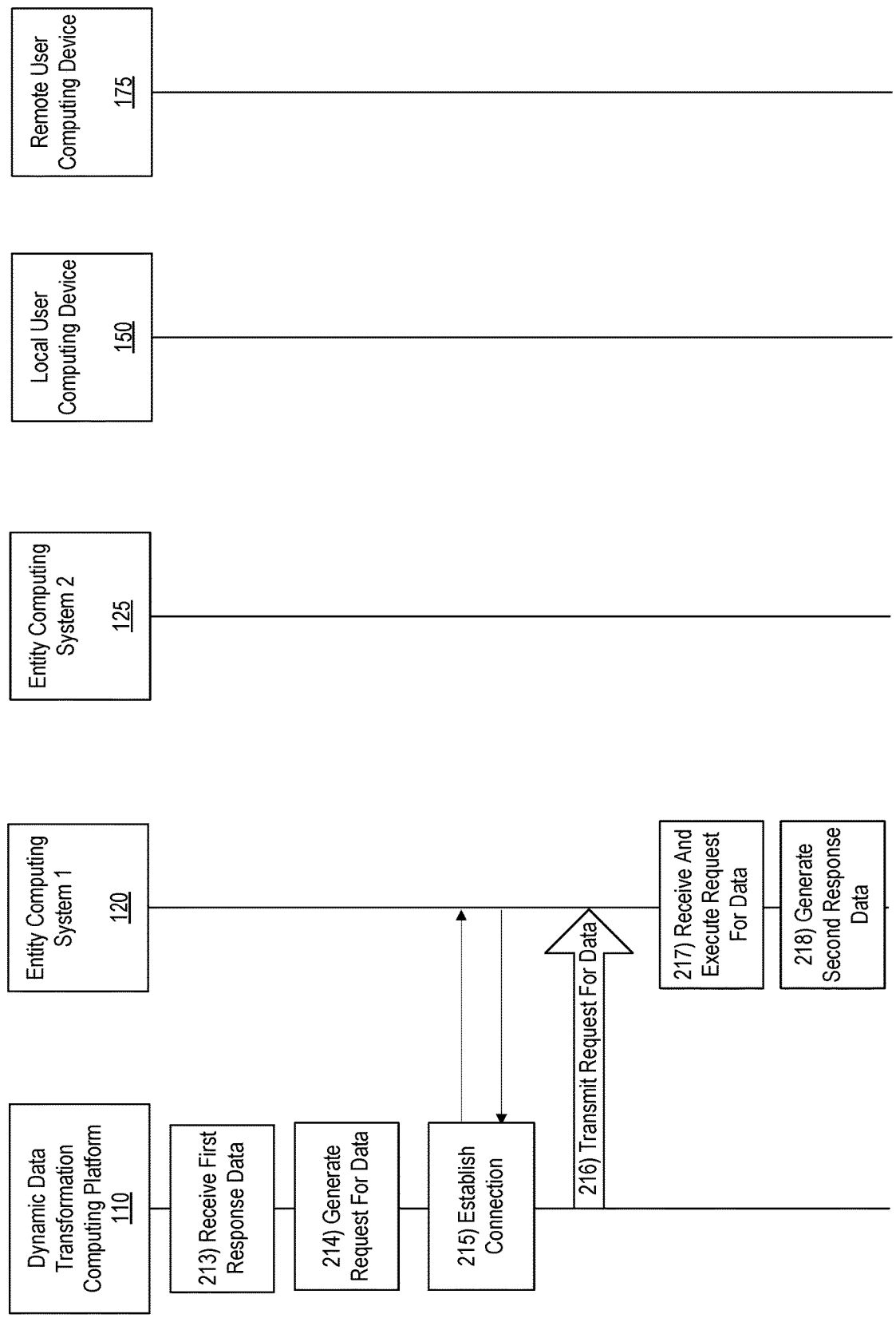

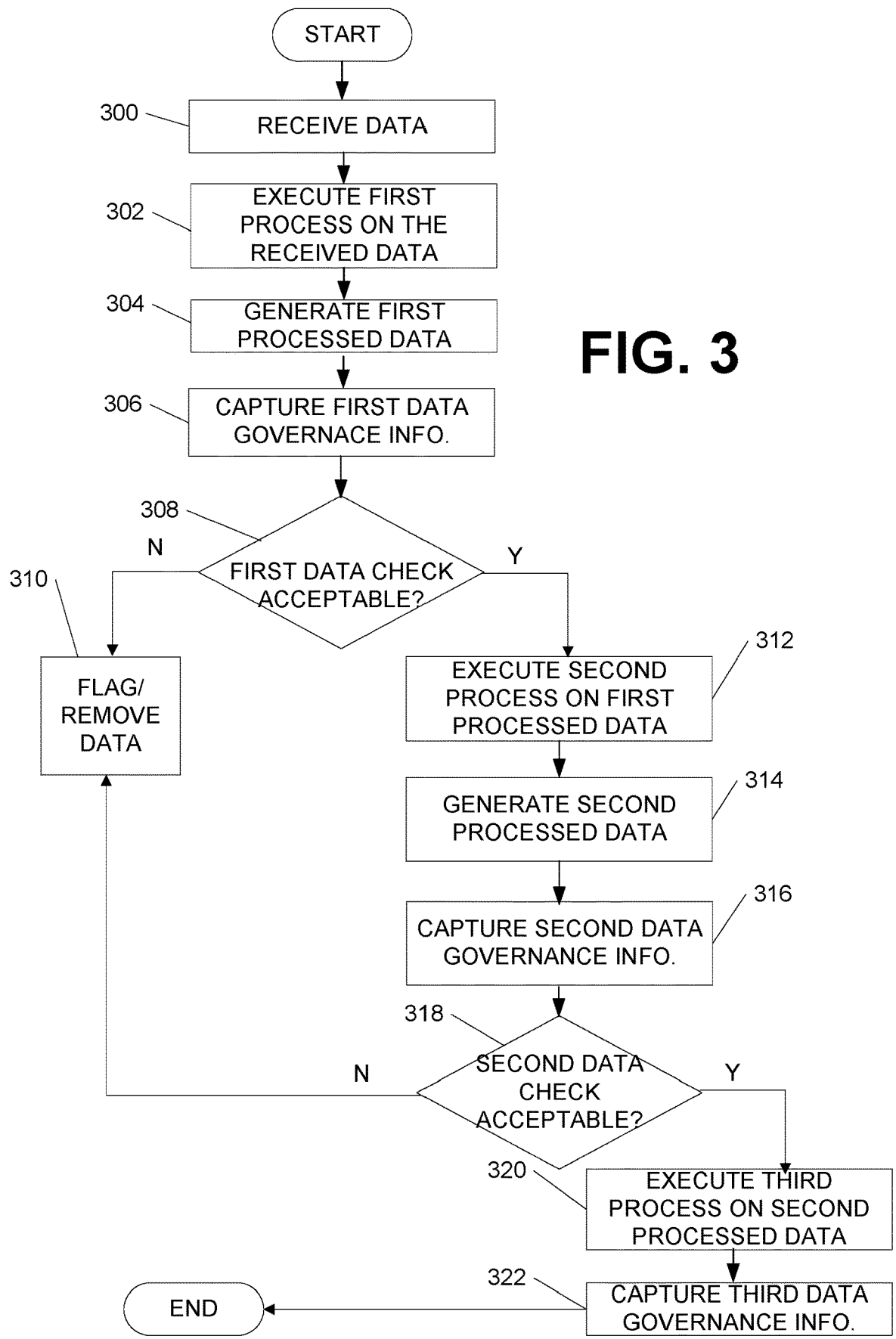

DYNAMIC DATA TRANSFORMATION SYSTEM

BACKGROUND

Aspects of the disclosure relate to electrical computers, systems, and devices for dynamically transforming data.

Large scale enterprises process vast amounts of data every day. The data is often captured via various applications, in various formats, and the like. As the data is processed, understanding data lineage (e.g., where the data came from, where the data is going), one or more data controls being executed, as well as any data transformation, are important aspects. Further, conventional systems often do not provide for dynamic transformation of data that may be useful in a large enterprise organization having vast amounts of data for processing.

In many enterprise organizations, reporting to one or more regulatory bodies is required. The reporting may, in some examples, require reporting related to data lineage, data controls and data transformation. Accordingly, providing consistent, accurate information related to data lineage, data controls, and data transformation, not only to these regulatory bodies, but for internal purposes, is important.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with dynamically transforming data and accurately tracking data governance.

In some examples, database data may be received. In some examples, the database data may be received from one or more entity computing systems. The database data may be ingested into a system, computing platform, or the like, and, in some examples, read into a memory of the system, computing platform, or the like, to enable in-memory processing. In some examples, ingesting the data may include executing one or more data governance functions, such as data quality evaluation functions, data controls, and the like. The ingested data may then be output for further processing as first processed data. In some examples, as the data is being ingested and/or processed, data governance information may be captured and stored.

In some examples, the first processed data may be further processed to execute one or more data transformations. In some examples, data transformations may include calculations, formatting, derivations, and the like. In some arrangements, second data governance functions may be executed, including data quality evaluations and/or data controls of, for instance, the transformed data. The transformed data may then be output as second processed data. In some examples, the system may capture second data governance information as the data is transformed.

The second processed data may then be further processed and published to one or more downstream databases for use in one or more applications executed by an entity. In some examples, third data governance information may be captured during publication.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing dynamic data transformation functions in accordance with one or more aspects described herein;

FIG. 3 depicts an illustrative method for implementing and using dynamic data transformation functions according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, large enterprise organizations process vast amounts of data on a daily basis. Efficiently executing data transformation and accurately capturing data governance information throughout these data transformation processes can be difficult using conventional systems. Accordingly, it is advantageous to dynamically transform data and self-document data governance information throughout the process.

As discussed herein, data may be received from one or more databases. The data may be ingested into a system and, in some examples, may be read into a memory of the system. One or more data governance functions may be executed on the ingested data, including data quality evaluation functions, data control functions, and the like. After the data is ingested, it may be further processed to execute one or more data transformations and/or additional data governance functions. The transformed data may then be published to one or more downstream databases for use in one or more applications executed by an entity.

These and various other arrangements will be discussed more fully below.

Figure 1A:
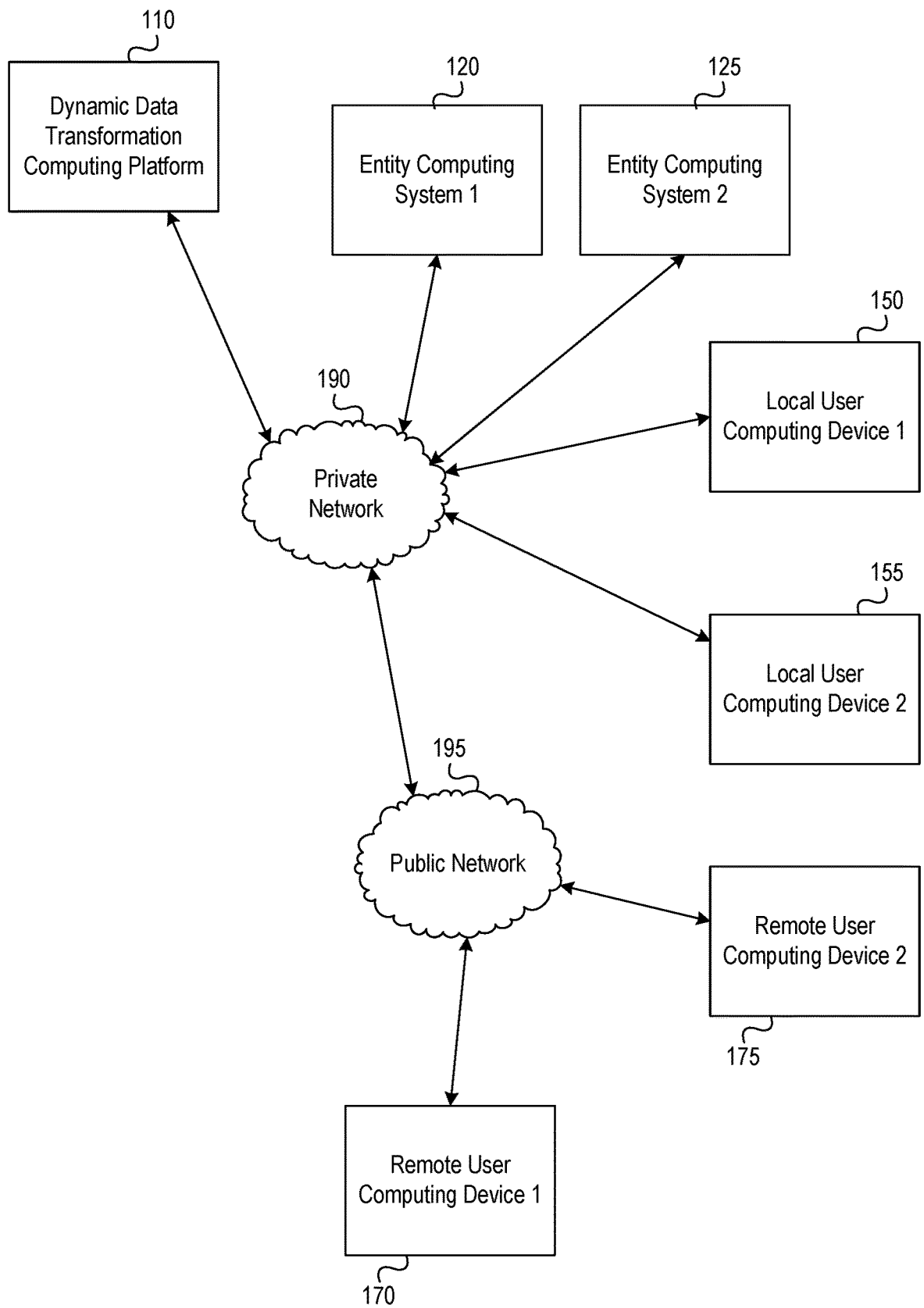
FIGS. 1A and 1B depict an illustrative computing environment for implementing dynamic data transformation functions in accordance with one or more aspects described herein.
Figure 1B:
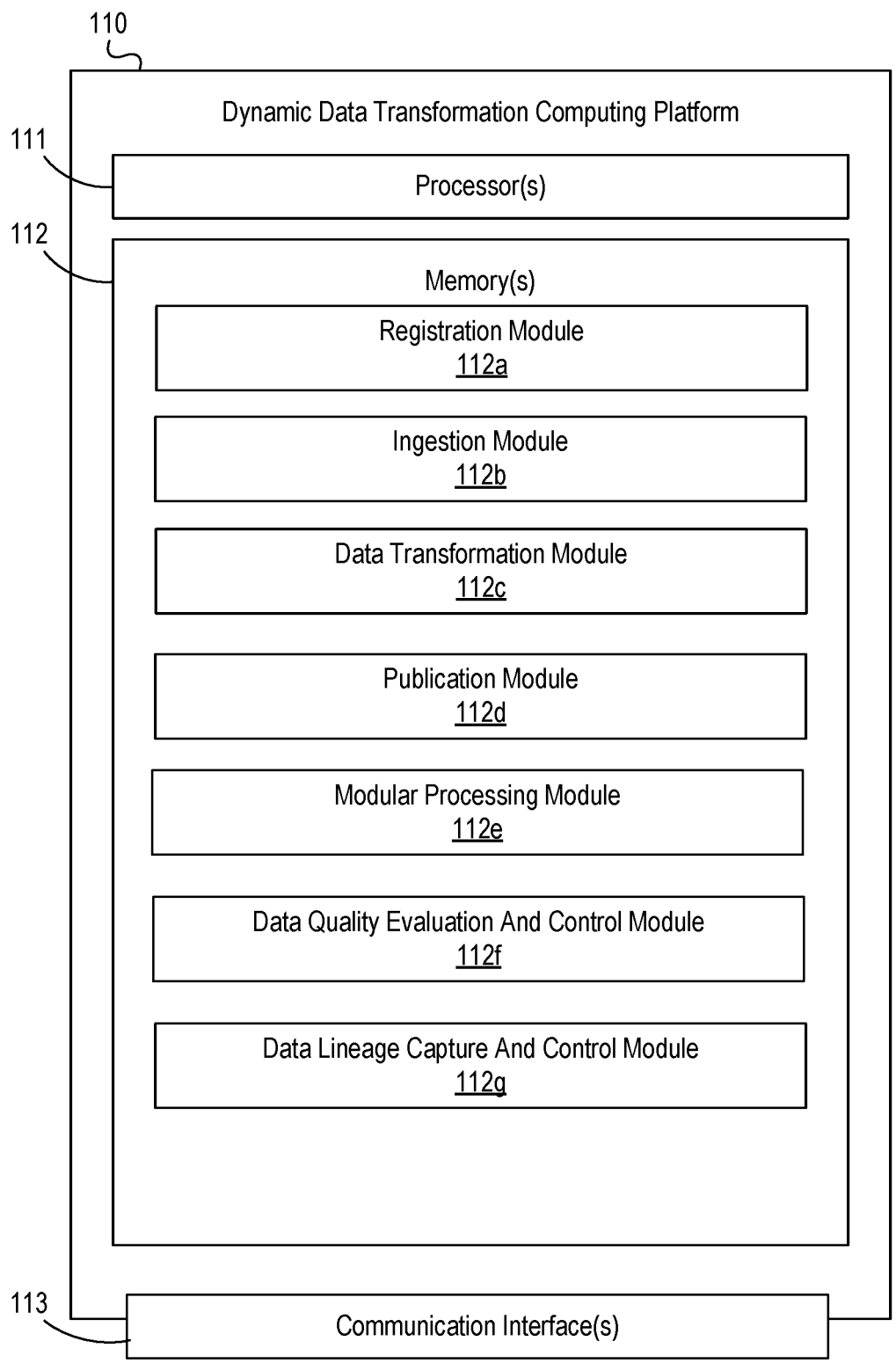

FIGS. 1A-1B depict an illustrative computing environment for implementing and using a system for dynamic data transformation in accordance with one or more aspects described herein. Referring to FIG. 1A, computing environment 100 may include one or more computing devices and/or other computing systems. For example, computing environment 100 may include dynamic data transformation computing platform 110, entity computing system 1 120, entity computing system 2 125, a first local user computing device 150, a second local user computing device 155, a first remote user computing device 170, and a second remote user computing device 175. Although two entity computing systems 120, 125 are shown, more or fewer entity computing devices may be used without departing from the invention.

Dynamic data transformation computing platform 110 may be configured to provide intelligent, dynamic, ingestion, transformation and publication of data, while executing one or more data governance functions, such as data quality evaluation functions, data controls, and the like, in order to ensure accuracy, completeness, or the like, of data being ingested, transformed, published, or the like. For instance, dynamic data transformation computing platform 110 may receive data from one or more sources. For instance, data may be received from one or more of databases, files, web services and/or message queues. Aspects described herein are described in the context of receiving data from databases, such as from databases associated with entity computing system 1 120, entity computing system 2 125, or the like. In some examples, the data may be relational database management system (RDBMS) data received from one or more entity computing systems, such as entity computing system 1 120, entity computing system 2 125, or the like. However, other types of data and/or sources of data may be used without departing from the invention.

In some examples, the data may be ingested by the dynamic data transformation computing platform 110 and may be read into a memory of the dynamic data transformation computing platform. Ingesting the data may further include executing one or more data governance functions, such as data quality evaluation functions, data control functions, and the like. For instance, the ingested data may be analyzed to evaluate various data values for accuracy (e.g., is the value an expected value), accuracy of range (e.g., is the value within an expected range), syntax (e.g., does the value have an expected length, number of characters, or the like), and the like. Data that does not meet quality expectations may be removed from further processing, flagged for alternate processing, or the like.

After executing the data governance functions on the ingested data, the data may be further processed to execute one or more data transformation functions. For instance, data transformation such as derivations, calculations, and the like, may be performed on the ingested data to generate transformed data. In some examples, additional data governance functions, such as one or more data quality evaluation functions, data control functions, or the like, may be executed on the transformed data to ensure data quality, accuracy, and the like.

In some examples, the code executed for data transformations may be written in any desired language and may be used to execute the requested data transformations. For instance, no additional code, modifications to code, or the like, may be required in order to execute the desired data transformations.

After the data is transformed, the transformed data may be further processed to publish the data to one or more output databases. In some examples, the output databases may be a different type of database than the database from which the data was received and/or ingested.

Further, as the data is processed (e.g., as data is ingested, transformed, published, and the like), data lineage information may be captured (e.g., self-reported). For instance, at each point at which data is processed, a record may be generated including a value of the data, a source of the data, a destination of the data, data quality evaluation results, data control outputs, data transformations executed, number of transformations executed, and the like. This information may be stored and may be used to generate one or more data governance information reports including data lineage information. Because the data lineage information is captured at each step automatically by the dynamic data transformation computing platform 110, the accuracy of the data lineage information is improved and the efficiency in generating and providing reports including the data may be improved.

In addition, because the ingested data is read into a memory associated with the dynamic data transformation computing platform 110, further processing performed by the dynamic data transformation computing platform 110 may be performed as in-memory processing, thereby reducing computing resources required to process the data and enabling more efficient data processing.

Although various aspects described herein refer to processes occurring in a particular order (e.g., as performed in ordered step flow), the processes described herein may be performed in another order (for example, directed acyclic graph processing) without departing from the invention. Further, although various aspects described herein refer to three processes being performed, more or fewer processes may be performed without departing from the invention. In some examples, data from multiple sources may be processed simultaneously.

Entity computing system 1 120 and entity computing system 2 125 may be computing devices suitable for hosting and/or executing one or more applications or work processes associated with operation of an entity, such as a large enterprise organization. Each entity computing system 120, 125 may have, store and/or include one or more databases, processors, memories, and the like. Each entity computing system 120, 125 may be or include a computing device configured to perform various functions for the entity and may include desktop, laptop, tablet computing devices, servers, or the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the dynamic data transformation computing platform 110, entity computing system 1 120, entity computing system 2 125, or the like to control parameters associated with the devices or systems, update or execute rules, modify settings and the like.

The remote user computing device 170 and remote user computing device 175 may be used to communicate with, for example, one or more systems, computing platforms, devices, or the like, to generate and/or display reports, user interfaces, and the like, including data lineage, data control and/or data tracking information captured via the dynamic data transformation computing platform 110. Remote user computing devices 170, 175 may include user computing devices, such as mobile devices including smartphones, tablets, laptop computers, and the like, and/or desktop or other computing devices and data received from one remote user computing device 170 may be used to generate outputs, cause display of outputs, and the like on one or more other remote user computing devices, such as remote user computing device 175.

Computing environment 100 also may include one or more computing platforms. For example, and as noted above, computing environment 100 may include dynamic data transformation computing platform 110. As illustrated in greater detail below, dynamic data transformation computing platform 110 may include one or more computing devices configured to perform one or more of the functions described herein. For example, dynamic data transformation computing platform 110 may include one or more computers (e.g., laptop computers, desktop computers, servers, server blades, or the like).

As mentioned above, computing environment 100 also may include one or more networks, which may interconnect one or more of dynamic data transformation computing platform 110, entity computing system 1 120, entity computing system 2 125, local user computing device 150, local user computing device 155, remote user computing device 170, and/or remote user computing device 175. For example, computing environment 100 may include private network 190 and public network 195. Private network 190 and/or public network 195 may include one or more subnetworks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic data transformation computing platform 110, entity computing system 1 120, entity computing system 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic data transformation computing platform 110, entity computing system 1 120, entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., dynamic data transformation computing platform 110, entity computing system 1 120, entity computing system 2 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., dynamic data transformation computing platform 110, entity computing system 1 120, entity computing system 2 125, local user computing device 150, local user computing device 155).

Referring to FIG. 1B, dynamic data transformation computing platform 110 may include one or more processors 111, memory 112, and communication interface 113. A data bus may interconnect processor(s) 111, memory 112, and communication interface 113. Communication interface 113 may be a network interface configured to support communication between dynamic data transformation computing platform 110 and one or more networks (e.g., private network 190, public network 195, or the like). Memory 112 may include one or more program modules having instructions that when executed by processor(s) 111 cause dynamic data transformation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic data transformation computing platform 110 and/or by different computing devices that may form and/or otherwise make up dynamic data transformation computing platform 110.

For example, memory 112 may have, store and/or include a registration module 112a. Registration module may store instructions and/or data that may cause or enable the dynamic data transformation computing platform 110 to receive data related to one or more entity systems, such as entity computing system 1 120, entity computing system 2 125, and the like, that may provide input data to the dynamic data transformation computing platform 110, receive output data from the dynamic data transformation computing platform, and the like. In some examples, the registration data may include identification of one or more databases from which data may be received, one or more databases to which data should be published, and the like.

Dynamic data transformation computing platform 110 may further have, store and/or include ingestion module 112b. Ingestion module 112b may store instructions and/or data that may cause or enable the dynamic data transformation computing platform 110 to receive data (e.g., from one or more entity systems, such as entity computing system 1 120, entity computing system 2 125, or the like), and ingest the data into the dynamic data transformation computing platform 110. In some examples, ingesting the data may include reading the data into a memory of the dynamic data transformation computing platform 110. This may enable in-memory processing of the data which may improve efficiency, reduce computing resources necessary to process the data, and the like.

In some examples, ingesting the data may include executing one or more data governance functions including, for example, quality evaluation functions and/or data control functions. For instance, one or more data quality evaluation functions and/or data control functions may be executed on the data being ingested. In some examples, the data quality evaluation and/or data control functions may be identified and retrieved from, for example, data quality evaluation and control module 112f. Data quality evaluation and control module 112f may store instructions and/or data that may cause or enable the dynamic data transformation computing platform 110 to execute one or more data quality evaluation and control functions, capture an output of the data quality evaluation and control functions, flag and/or remove data that does not meet data quality and/or data control standards, and the like.

In some examples, the data quality evaluation and control module 112*f* may store various data quality, data controls, and the like, functions that may be executed on data at one or more processing phases. For instance, one or more data quality evaluation, data control, and the like, functions may be executed on data, in some examples, more than once, to capture data lineage information, data accuracy information, and the like. For instance, one or more functions may be executed as data is ingested, after data is ingested, before data is transformed, after data is transformed, before data is published, or the like.

In some arrangements, data quality evaluation and control module 112*f* may store functions such as runtime data lineage, data movement controls or data integrity checks (e.g., source to target), valid value checks (e.g., confirming that a data value is an expected value, foreign key checks, length checks (e.g., ensuring that a value has a proper length or number of characters), range checks (e.g., ensuring that a value is within an expected range), checks for completeness (e.g., ensuring all necessary fields have a data value), format checks (e.g., confirming that data is in an expected format), reasonableness controls (e.g., confirming that a data value is within a predetermined percentage of an expected value, a previous value, or the like), uniqueness controls, and custom controls including, for example, hive query language (HQL) checks. Various other data quality and data control evaluation functions may be store and/or executed by the data quality evaluation and control module 112*f* and/or one or more other modules of the dynamic data transformation computing platform 110.

Dynamic data transformation computing platform 110 may further have, store and/or include data transformation module 112*c*. Data transformation module 112*c* may store instructions and/or data that may cause or enable the dynamic data transformation computing platform 110 to process the ingested data to dynamically perform or execute one or more data transformation functions on the ingested data. In some examples, the dynamic data transformations may be considered just-in-time data transformations. For instance, one or more calculations, derivations, or the like, may be dynamically performed on the ingested data to transform the data from a first value to a second, transformed value. In some examples, the data transformation module 112*c* may retrieve one or more data governance functions, such as data quality evaluation and/or data control functions from, for example, data quality evaluation and control module 112*f*, and may execute the one or more data quality evaluation and/or data control functions (e.g., on transformed data) to ensure data quality, capture further data lineage information, flag or remove inaccurate data, or the like.

In some examples, the data transformation functions may be performed using in-memory processing on the data read into the memory of the dynamic data transformation computing platform 110.

Dynamic data transformation computing platform 110 may further have, store and/or include publication module 112*d*. Publication module 112*d* may store instructions and/or data that may cause or enable the dynamic data transformation computing platform 110 to receive the transformed data and publish it to one or more downstream databases for use in one or more applications executed by the entity. In some examples, the downstream database to which the data is published may be a different database or different database type from the database or database type from which data was received and ingested.

In some examples, data governance functions such as data quality evaluation and/or data control functions may be executed on the published data or data expected to publish. The publication module 112*d* may receive one or more data quality evaluation and/or data control functions from the data quality evaluation and control module 112*f* and may execute the functions. Further, data lineage information may be captured as the data is received by the publication module 112*d*, as the data is published to one or more databases, or the like.

Dynamic data transformation computing platform 110 may further have, store and/or include modular processing module 112*e*. Modular processing module 112*e* may store instructions and/or data that may cause or enable dynamic data transformation computing platform 110 to generate modular code that may be used to process various types of data (e.g., ingested data, published data, or the like). For instance, one or more templates may be pre-generated. The templates may include code to execute one or more common tasks associated with ingesting the data, publishing the data, and the like. In some examples, one or more pre-generated templates may be selected for processing particular or identified data and, in some arrangements may be modified to accommodate one or more desired business rules. Accordingly, data processing may be performed seamlessly and efficiently throughout the system and process, while improving consistency within the system and reducing development time.

In some examples, the templates generated may include code for common tasks associated with ingestion and publication. For instance, a first template may be generated for processing data from environment 1 into environment 2. Environment 1 may include a first database type and environment 2 may include a second database type. The template may then include tasks associated with ingesting data from environment 1 and publishing data to environment 2 (e.g., execution of data governance functions, capture of data governance information, necessary formatting, and the like). Data transformation functions may also be executed by the template or may be separate code written based on the desired data transformation. Additionally or alternatively, separate templates may be used for ingestion tasks and publication tasks.

In some examples, if a new environment is being used for ingestion, publication or the like, a template may be cloned and necessary modifications to accommodate the new environment may be made. Accordingly, development time is greatly reduced because only environment specific modifications may be made to the new template, rather than generating an entire new template, writing new code, and the like.

These template arrangements may enable developers to focus resources on writing code for executing particular data transformations, rather than spending resources writing code associated with ingesting data, performing data checks, and the like.

Dynamic data transformation computing platform 110 may further have, store and/or include data lineage capture and control module 112*g*. Data lineage capture and control module 112*g* may store instructions and/or data that may cause or enable the dynamic data transformation computing platform 110 to capture data governance information, such as data lineage information throughout the dynamic data transformation process. For instance, as data is ingested, transformed, published, and the like, data lineage and/or data control/quality information may be captured and stored (e.g., in data lineage capture and control module 112g). In some examples, data source, data destination, data transformation functions, and the like, may be captured. Further, one or more data quality evaluation functions and/or data control functions executed on the data may be captured, along with an output of the executed functions. Additional data lineage information may be captured without departing from the invention.

In some arrangements, data lineage capture and control module 112g may further store instructions and/or data that may cause or enable the dynamic data transformation computing platform 110 to generate one or more data lineage reports, logs, or the like. These reports may be efficiently generated based on the data lineage and control information captured (e.g., automatically) at each phase or step of the dynamic data transformation process described herein.

FIGS. 2A-2F depict one example illustrative event sequence for implementing and using dynamic data transformation functions in accordance with one or more aspects described herein. The events shown in the illustrative event sequence are merely one example sequence and additional events may be added, or events may be omitted, without departing from the invention.

Figure 2A:
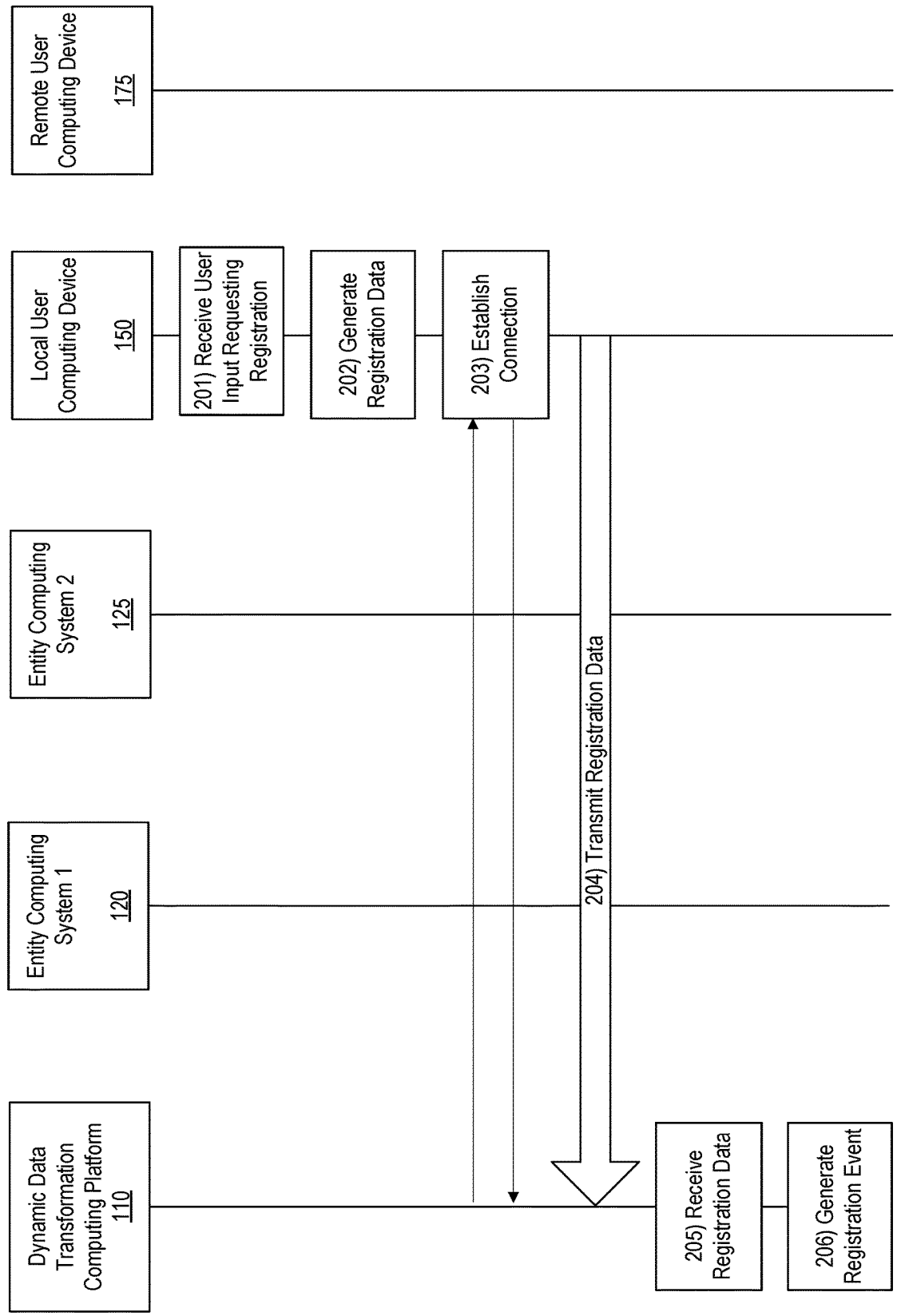

With reference to FIG. 2A, at step 201, user input requesting registration may be received. For instance, user input requesting registration of one or more entity computing systems may be received. The request for registration may include identification of the one or more systems, such as entity computing system 1 120, entity computing system 2 125, and the like.

At step 202, registration data may be generated. For instance, data associated with the one or more systems, or the like, being registered may be generated. The data may include further identification/details of the systems being registered, such as entity computing system 1 120, entity computing system 2 125, and the like, identification of particular databases from which data may be received, to which data may be published, and the like.

At step 203, a connection may be established between the local user computing device 150 and the dynamic data transformation computing platform 110. For instance, a first wireless connection may be established between the dynamic data transformation computing platform 110 and local user computing device 150. Upon establishing the first wireless connection, a communication session may be initiated between dynamic data transformation computing platform 110 and local user computing device 150.

At step 204, the registration data may be transmitted from the local user computing device 150 to the dynamic data transformation computing platform 110. In some examples, the registration data may be transmitted during the communication session initiated upon establishing the first wireless connection.

At step 205, the registration data may be received and, in some examples, one or more dynamic data transformation functions or processes may be initiated and/or activated by the dynamic data transformation computing platform 110.

At step 206, responsive to receiving the registration data, a registration event may be generated. In some examples, the registration event may include storing registration information, initiating communication with one or more devices or systems, or the like.

Figure 2B:
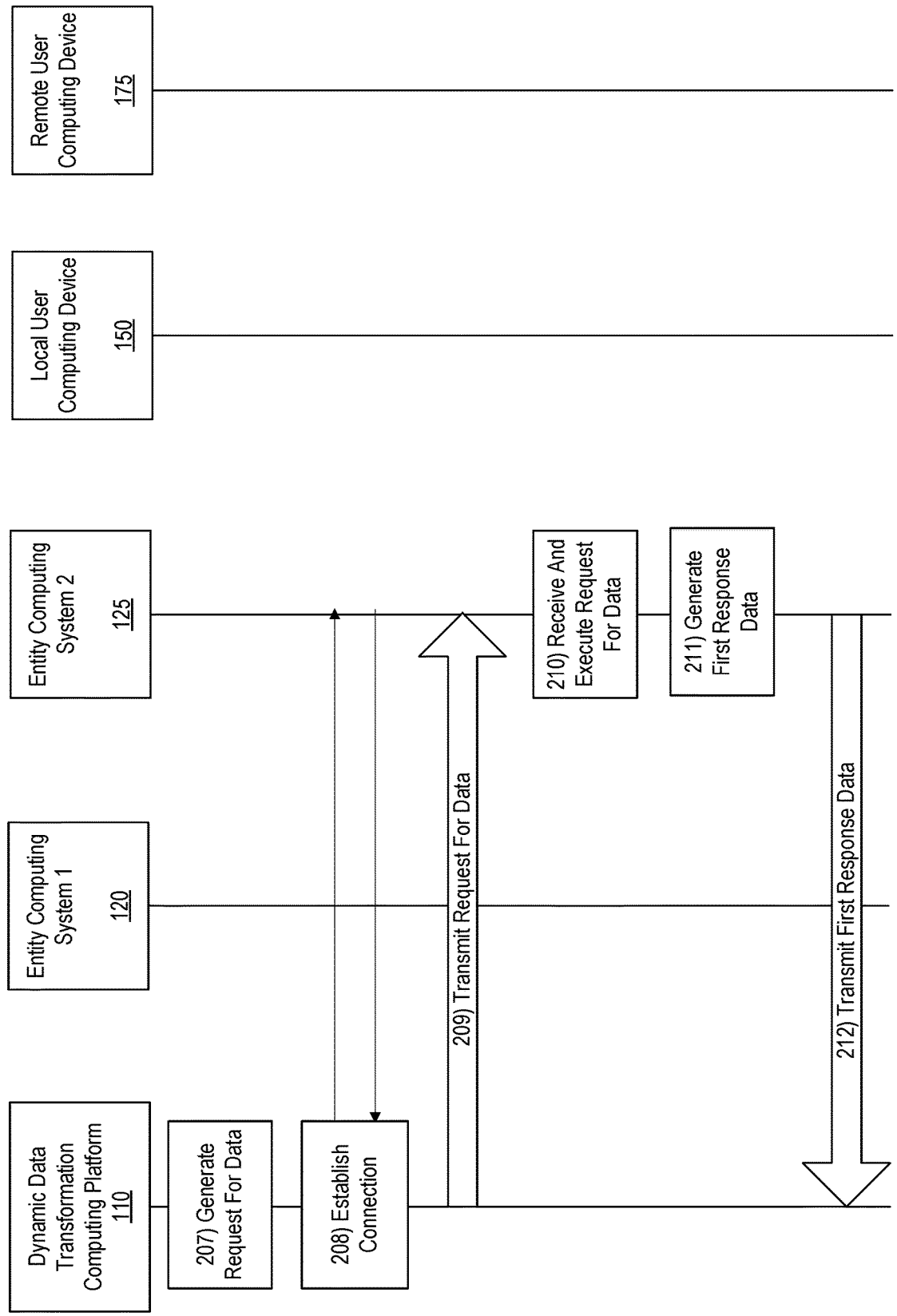

With reference to FIG. 2B, at step 207, a request for data may be generated. For instance, based on a system, device or the like being registered, a request for data (e.g., RDBMS data) from that device, system or the like may be generated. For example, a request for data from entity computing system 2 125 may be generated. In some examples, the request for data may include requesting data for transmission in a continuation stream, in batch transfers, or the like.

At step 208, a connection may be established between the dynamic data transformation computing platform 110 and entity computing system 2 125. For instance, a second wireless connection may be established between the dynamic data transformation computing platform 110 and entity computing system 2 125. Upon establishing the second wireless connection, a communication session may be initiated between dynamic data transformation computing platform 110 and entity computing system 2 125.

At step 209, the request for data may be transmitted from the dynamic data transformation computing platform 110 to the entity computing system 2 125. In some examples, the request for data may be transmitted during the communication session initiated upon establishing the second wireless connection. At step 210, the request for data may be received and executed. At step 211, first response data may be generated by the entity computing system 2 125. For instance, the first response data may include streaming data, batch data, or the like.

At step 212, the first response data may be transmitted from entity computing system 2 125 to the dynamic data transformation computing platform 110. In some examples, the data may be transmitted (e.g., as a data stream, as batch data, or the like) during the communication session initiated upon establishing the second wireless connection.

With reference to FIG. 2C, at step 213, the first response data may be received by the dynamic data transformation computing platform.

At step 214, a request for data may be generated. For instance, based on a system, device or the like being registered, a request for data (e.g., RDBMS data) from that device, system or the like may be generated. For example, a request for data from entity computing system 1 120 may be generated. In some examples, the request for data may be requesting data for transmission in a continuation stream, in batch transfers, or the like.

At step 215, a connection may be established between the dynamic data transformation computing platform 110 and entity computing system 1 120. For instance, a third wireless connection may be established between the dynamic data transformation computing platform 110 and entity computing system 1 120. Upon establishing the third wireless connection, a communication session may be initiated between dynamic data transformation computing platform 110 and entity computing system 1 120.

At step 216, the request for data may be transmitted from the dynamic data transformation computing platform 110 to the entity computing system 1 120. In some examples, the request for data may be transmitted during the communication session initiated upon establishing the third wireless connection. At step 217, the request for data may be received and executed. At step 218, second response data may be generated by the entity computing system 1 120. For instance, the second response data may include streaming data, batch data, or the like.

Figure 2D:
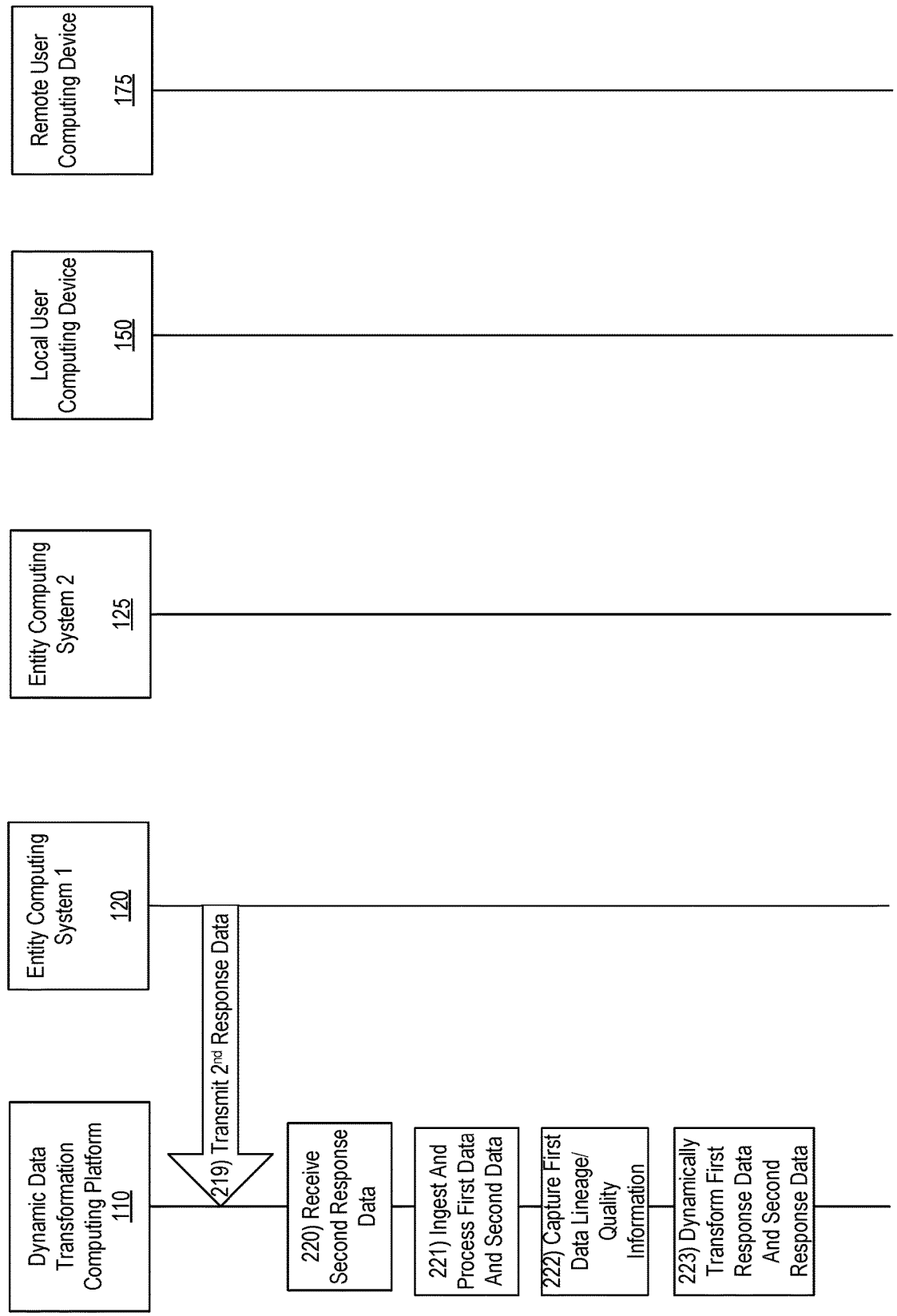

With reference to FIG. 2D, at step 219, the second response data may be transmitted from entity computing system 1 120 to the dynamic data transformation computing platform 110. In some examples, the data may be transmitted (e.g., as a data stream, as batch data, or the like) during the communication session initiated upon establishing the third wireless connection.

At step 220, the second response data may be received by the dynamic data transformation computing platform 110. At step 221, the first response data and second response data may be ingested and processed by the dynamic data transformation computing platform 110 (e.g., by ingestion module 112*b*). For instance, the first response data and second response data may be read into a memory of the dynamic data transformation computing platform 110. Accordingly, any further processing of the first response data and second response data may be performed in-memory, thereby reducing the computing resources needed to process the data, improving efficiency and speed of processing, and the like.

Although the arrangements shown and described include receiving and processing data from two entity computing systems, data may be received and processed from more or fewer entity computing systems without departing from the invention.

In some examples, the first response data and second response data may be data from a first database type (e.g., a same database type). In other examples, the first response data may be from a first database type while the second response data may be from a second, different database type.

In some arrangements, ingesting and/or processing the first response data and the second response data may include performing data quality evaluation and/or data control functions. For example, ingested data values may be compared to previously ingested data values to identify abnormalities in the data. Various other accuracy checks, data control checks, and the like, as discussed more fully herein, may be performed without departing from the invention, such as evaluating that values are within an expected range, evaluating data values to determine whether they include data of an expected length, and the like. After conducting any desired data quality and/or data control evaluations, the ingested data may be further processed. In some examples, the ingestion may be considered a first processing step resulting in first processed data which may then be further processed in subsequent processing steps (e.g., data transformation, data publication, or the like).

At step 222, first data lineage/data quality information may be captured. For instance, data associated with a source of the ingested data, outputs from one or more data quality and/or data control functions, and the like, may be captured by the dynamic data transformation computing platform 110 and stored, as discussed more fully herein. In some examples, aspects of the data lineage information may be captured as the data is processed.

After the data is ingested, at step 223, the ingested data (e.g., the first processed data) may be dynamically transformed. For instance, using in-memory processing in at least some examples, one or more transformation processes may be executed on the ingested data (e.g., the first processed data). Some example transformation processes may include calculations, formatting of data, derivations, and the like. In some examples, additional data quality evaluations and/or data control functions may be performed on the transformed data. For instance, accuracy of transformed data may be confirmed, output values may be compared to previous or expected values, and the like. In some examples, the data transformation and data quality/data control evaluations may be considered a second processing function and the output (e.g., the transformed, quality verified data) may be considered second processed data.

Figure 2E:
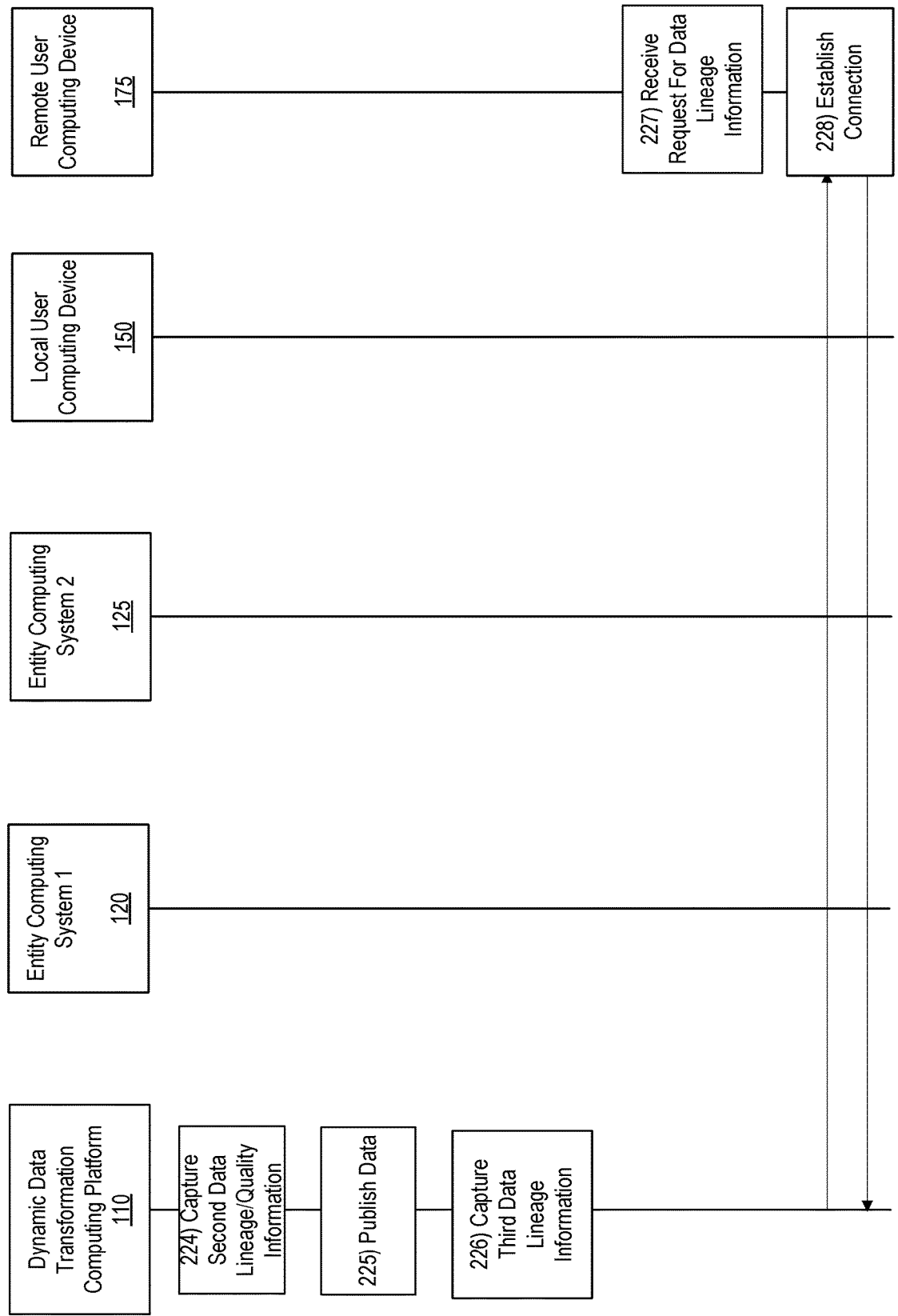

With reference to FIG. 2E, at step 224, second data lineage/data quality information may be captured. For instance, data associated with a source of the transformed data, outputs from one or more data quality and/or data control functions, data transformations performed or executed on the data (e.g., the ingested or first processed data) and the like, may be captured by the dynamic data transformation computing platform 110 and stored, as discussed more fully herein. In some examples, aspects of the data lineage information may be captured as the data is processed.

At step 225, the transformed data (e.g., the second processed data) may be published to one or more systems, databases or the like. For instance, the transformed data (e.g., the second processed data) may be published to a publication or distribution layer that may then transmit or publish the data to one or more downstream databases for use in one or more applications executing on entity devices. In some examples, the data may be published to a system, database or the like having a type different from the database from which it was received or ingested. In some examples, publishing the data may include formatting the data for one or more identified downstream databases to which the data will be distributed.

At step 226, third data lineage/data quality information may be captured. For instance, data associated with a source of the data being published, destination of the data being published, formatting functions performed, outputs from one or more data quality and/or data control functions, and the like, may be captured by the dynamic data transformation computing platform 110 and stored, as discussed more fully herein. In some examples, aspects of the data lineage information may be captured as the data is processed.

Accordingly, as data lineage information is automatically captured throughout the entire process (e.g., from receipt/ingestion of data through publication of data), the lineage is self-documenting, which ensures accuracy and improves efficiency. Further, the use of data governance functions throughout the process ensures completeness of the data lineage information.

At step 227, a request for data lineage information may be received. For instance, the request for data lineage information may be received by, for instance, remote user computing device 175. In some examples, the request for data lineage may be received by another remote user computing device, such as remote user computing device 170, and/or by a local user computing device, such as local user computing device 150, local user computing device 155, or the like.

The request for data lineage information may be for internal use (e.g., internal to the entity implementing the dynamic data transformation computing platform 110) or may be for external use (e.g., to be provided to one or more regulatory bodies). The request for data lineage information may include identification of particular data, systems, devices, time periods, or the like, for which the lineage information is being requested. This information may be processed and, at step 228, a connection may be established between the remote user computing device 175 (or other device receiving the request for data lineage information) and the dynamic data transmission computing platform 110. For instance, a fourth wireless connection may be established between the dynamic data transformation computing platform 110 and remote user computing device 175. Upon establishing the fourth wireless connection, a communication session may be initiated between dynamic data transformation computing platform 110 and remote user computing device 175.

Figure 2F:
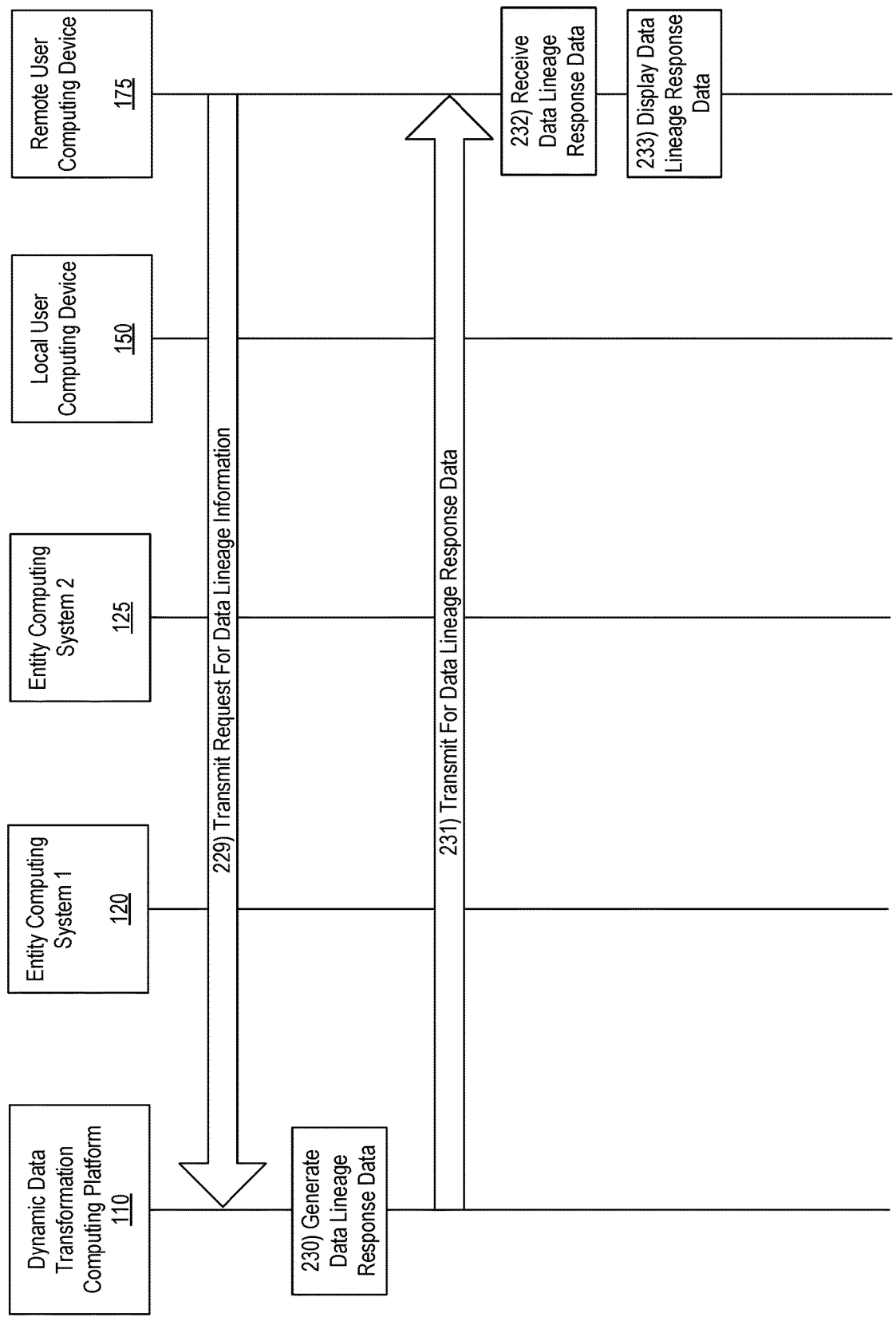

With reference to FIG. 2F, at step 229, the request for data lineage information may be transmitted from the remote user computing device 175 to the dynamic data transformation computing platform 110. In some examples, the request for data lineage information may be transmitted during the communication session initiated upon establishing the fourth wireless connection.

At step 230, the request for data lineage information may be received and executed and data lineage response data may be generated. In some examples, the data lineage response data may include data lineage information (e.g., sources, destinations, transformations, data quality outputs, data controls, or the like) for the identified data, systems, devices, or the like.

At step 231, the data lineage response data may be transmitted from the dynamic data transformation computing platform 110 to the remote user computing device 175. At step 232, the data lineage response data may be received by the remote user computing device 175 and, at step 233, the data lineage response data may be displayed by a display of the remote user computing device 175.

As discussed herein, although some aspects describe the processes being executed in sequential order or using ordered step flow processing, in some examples, one or more processes may be executed in parallel and/or using directed acyclic graph processing. For instance, in some examples, data from multiple sources may be received and/or ingested. In some examples, a first ingested data set may be processed to apply data quality checks while, in some examples, simultaneously, a second data set may be transformed. In some arrangements, processes may be performed on a same data set in parallel (e.g., data quality checks and data ingestion processes, data quality checks and dynamic data transformations, or the like).

FIG. 3 is a flow chart illustrating one example method of implementing dynamic data transformation functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, data may be received. For instance, data may be received by a dynamic data transformation computing platform 110 from one or more entity computer systems, such as entity computing system 1 120, entity computing system 2 125, and the like. In some examples, the data may be received from a first database type different from a database type of a downstream database to which the data will be output.

At step 302, a first process may be executed on the received data. For instance, a first process may include ingesting the data including reading the data into a memory of the dynamic data transformation computing platform 110 in order to enable in-memory processing of the data. In some examples, first data governance functions may be executed on the first data (e.g., as part of the first process being executed). The first data governance functions may include data quality evaluation functions, data controls, and the like, as discussed herein.

In some examples, the first process may be executed without requiring development of additional code. For instance, templates for ingesting/processing data may be generated and used to execute common tasks. This may reduce development time and provide for greater consistency.

After executing the first process on the received data, first processed data may be generated at step 304 and output for further processing. At step 306, first data governance information may be captured. For instance, as the received data is processed, data governance information may be captured automatically, including data lineage information (e.g., source, destination, and the like), data controls executed, output of data quality evaluations, and the like. Accordingly, the data lineage information may be self-documenting.

At step 308, a determination may be made as to whether one or more data elements met the executed data controls, data quality evaluations, and the like. If not, the data may be flagged for further processing, removed from the data processing stream, or the like, at step 310.

If the first data check is acceptable at step 308, the first processed data may be further processed. For instance, at step 312, a second process may be executed on the first processed data. In some examples, the second process may include one or more data transformations, such as formatting, calculations, derivations, and the like.

In some examples, the second process may further include executing additional (e.g., second) data governance functions on the transformed data. For instance, further data quality evaluations may be performed, data controls may be executed, and the like.

In some examples, data transformations may include execution of code provided by one or more developers in any desired language. For instance, a developer may generate code to execute one or more data transformations in any desired language and the dynamic data transformation computing platform 110 may have the flexibility to execute the code, regardless of the language in which it was written.

After executing the additional data governance functions, the transformed data may be identified as second processed data at step 314 and output for further processing.

At step 316, second data governance data may be captured. For instance, as the second process is being executed on the first processed data (e.g., data transformation, data governance functions executed, and the like) second data governance data may be captured. For instance, a source and/or destination of the transformed data (e.g., second processed data) may be captured, transformations executed on the data may be captured, a number of transformations performed on the data may be captured, output of data quality evaluations and/or data controls may be captured, and the like. Similar to the arrangement above, this self-documenting data lineage information may be stored for later use.

At step 318, a determination may be made as to whether second data checks were acceptable. For instance, a determination may be made as to whether an output of data quality evaluations, and the, like, were acceptable. If not, the data may be flagged for further processing, removed from further processing, or the like, at step 310.

If the output of the second quality checks is acceptable, the second processed data may be further processed. For instance, a third process may be executed on the second processed data at step 320. In some examples, executing the third process may include publishing the data to one or more downstream databases for use in one or more applications executed by the entity (e.g., on one or more entity computing systems such as entity computing system 1 120, entity computing system 2 125, or the like). In some examples, executing the third process may include executing still additional (e.g., third) data governance functions, such as data quality evaluations, data controls, and the like.

In some examples, similar to the first process, publication of the data might not require any additional code or modifications to code. Rather, pre-generated templates may be used to execute common tasks associated with publishing the data. Again, this may reduce development time and result in greater consistency through the process.

At step 322, third data governance information may be captured. For instance, a source and destination of the published data may be captured, output of data quality evaluations and/or data controls may be captured, and the like. Similar to the arrangements described above, this self-documenting data lineage information may be stored for later use.

Although aspects described above with respect to, for example, FIGS. 2A-2F and 3 include performing three processes on the data, more or fewer processes may be performed without departing from the invention. Further, processes may be performed in a sequential manner, in parallel, or in a hybrid of the two (e.g., sequential and parallel) without departing from the invention. In some examples, as discussed herein, processes may be executed using ordered step flow processing. Additionally or alternatively, processes may be performed using directed acyclic graph processing.

As discussed herein, aspects described herein are directed to providing systems for consistently identifying, capturing and/or tracking data governance information, such as data controls, data quality evaluation, data transformations, and the like, as data is dynamically transformed. As discussed herein, data may be received by a system, such as dynamic data transformation computing platform 110. The received data may be database data, such as RDBMS data. In some examples, the received data may be ingested into the computing platform. For instance, the data may be ingested into to the computing platform from one or more upstream systems and/or databases and loaded into a current environment. In some examples, the data may be written to a memory of the computing platform. The data may be transformed and then published to one or more downstream databases. Throughout the entire process, data governance information may be automatically captured and stored for later retrieval.

In some arrangements, one or more configuration files may be used to execute the one or more processes described herein. For instance, a configuration file executing on the dynamic data transformation computing platform 110 may control the ingestion, transformation and publication processes. In some examples, the configuration file may include code directing the system to read data from a particular database (e.g., action=GetRDBMS) and store the data in a first dataframe. Further processing of the data may be performed as in-memory processing to avoid reading the data multiple times in order to execute processing functions. As discussed herein, this will improve efficiency, reduce computing resources needed, and the like.

Once the data is within the first dataframe, the configuration file may execute one or more data governance functions (e.g., action=ApplyDataQuality). For instance, the configuration file may include identification of one or more functions or groups of functions to be executed. The configuration file may then include identification of one or more data transformations to execute (e.g., action=ExecuteSQL) on the data in the first dataframe. The SQL data transformations may then be executed. As discussed herein, data transformations may be written using any desired programming language, such as Scala™, Java™, Python™, and/or SQL™. and may be executed by the system.

After executing the data transformations, the data may be output to a second dataframe. The configuration file may then identify the second dataframe as the data for publication to one or more downstream databases (e.g., action=PutDataToDatabase2).

Aspects described herein may be used for processing data in various environments. The arrangements described herein are scalable and can be used regardless of workload. Also, while the dynamic data transformation processes and functions described herein may be used in any data processing arrangement, in some examples, the self-documenting nature of the data governance/data lineage information described herein may be advantageous for use in industries in which regulatory reporting is required. For instance, industries such as financial services may implement the arrangements described herein to accurately, completely and efficiently capture data governance/data lineage information throughout an entire process. Further, the use of templates may provide consistency and simplicity in capturing data governance information. This captured information may then be stored and used to generate requested data lineage reporting documents, both for regulatory agencies and for internal use.

The self-documenting nature of the processes described herein may also provide an automated audit trail of data sources, data destinations, data transformations, data quality, and the like. This automated audit trail may then be used to provide required information to one or more regulatory bodies. By providing an automated audit trail for regulators may ensure accuracy in reporting processes, efficiency in providing regulatory information, and the like.

Further, some aspects described herein may be used to enable efficient changes to one or more work processes without requiring full testing, deployment, permanent modifications to code, and the like. For instance, if a temporary change is desired, source code may be generated and executed without being put into the full production environment. That is, modified code may be provided to a code repository (not within the production environment) but the dynamic data transformation computing platform 110 may execute the modified code (e.g., from the code repository) without making a permanent change to the code.

Figure 4:
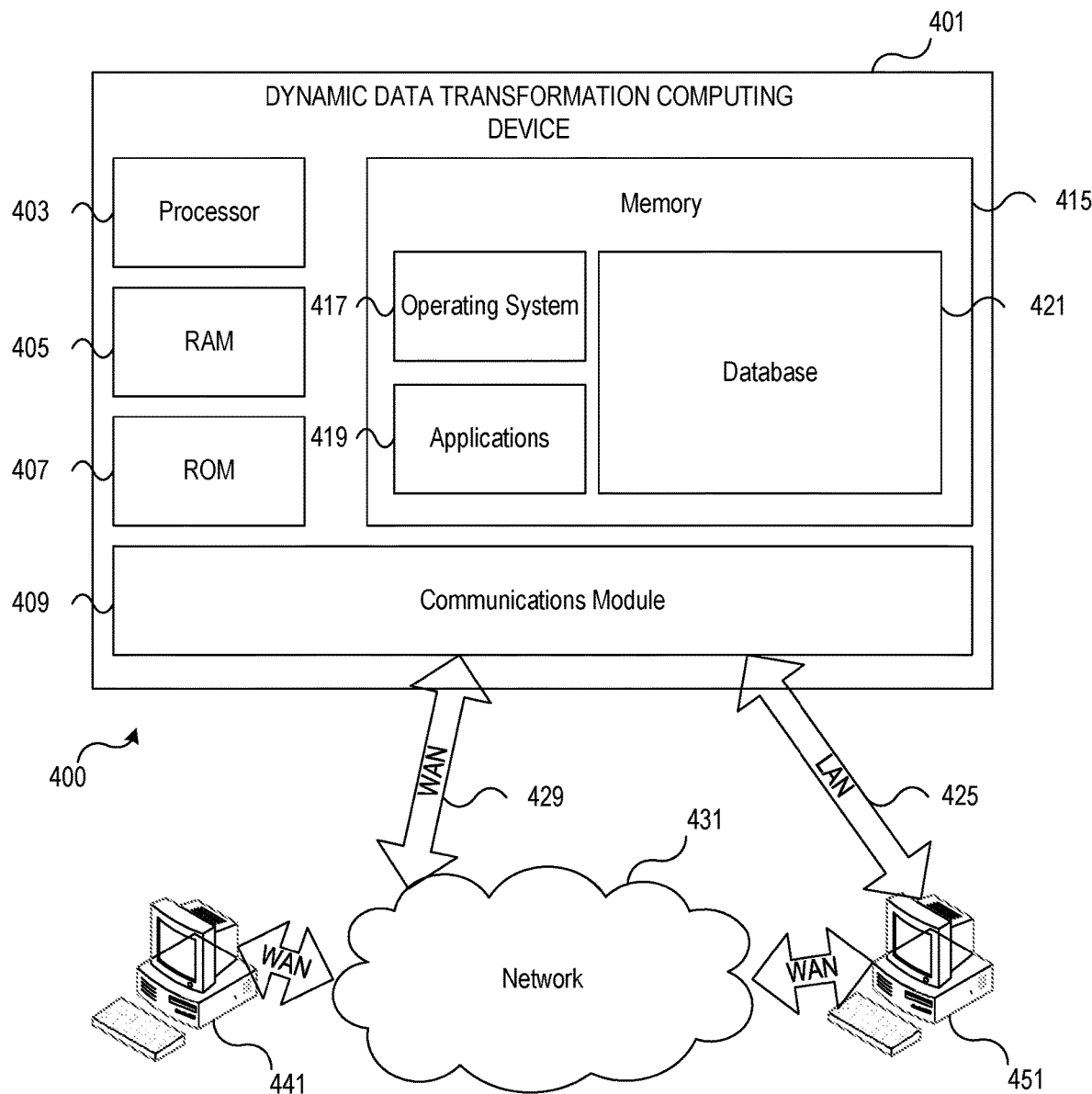
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include dynamic data transformation computing device 401 having processor 403 for controlling overall operation of dynamic data transformation computing device 401 and its associated components, including Random Access Memory (RAM) 405, Read-Only Memory (ROM) 407, communications module 409, and memory 415. Dynamic data transformation computing device 401 may include a variety of computer readable media. Computer readable media may be any available media that may be accessed by dynamic data transformation computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic data transformation computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic data transformation computing device 401. Such a processor may execute computer-executable instructions stored on a computer-readable medium.

Software may be stored within memory 415 and/or storage to provide instructions to processor 403 for enabling dynamic data transformation computing device 401 to perform various functions as discussed herein. For example, memory 415 may store software used by dynamic data transformation computing device 401, such as operating system 417, application programs 419, and associated database 421. Also, some or all of the computer executable instructions for dynamic data transformation computing device 401 may be embodied in hardware or firmware. Although not shown, RAM 405 may include one or more applications representing the application data stored in RAM 405 while dynamic data transformation computing device 401 is on and corresponding software applications (e.g., software tasks) are running on dynamic data transformation computing device 401.

Communications module 409 may include a microphone, keypad, touch screen, and/or stylus through which a user of dynamic data transformation computing device 401 may provide input, and may also include one or more of a speaker for providing audio output and a video display device for providing textual, audiovisual and/or graphical output. Computing system environment 400 may also include optical scanners (not shown).

Dynamic data transformation computing device 401 may operate in a networked environment supporting connections to one or more remote computing devices, such as computing devices 441 and 451. Computing devices 441 and 451 may be personal computing devices or servers that include any or all of the elements described above relative to dynamic data transformation computing device 401.

The network connections depicted in FIG. 4 may include Local Area Network (LAN) 425 and Wide Area Network (WAN) 429, as well as other networks. When used in a LAN networking environment, dynamic data transformation computing device 401 may be connected to LAN 425 through a network interface or adapter in communications module 409. When used in a WAN networking environment, dynamic data transformation computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
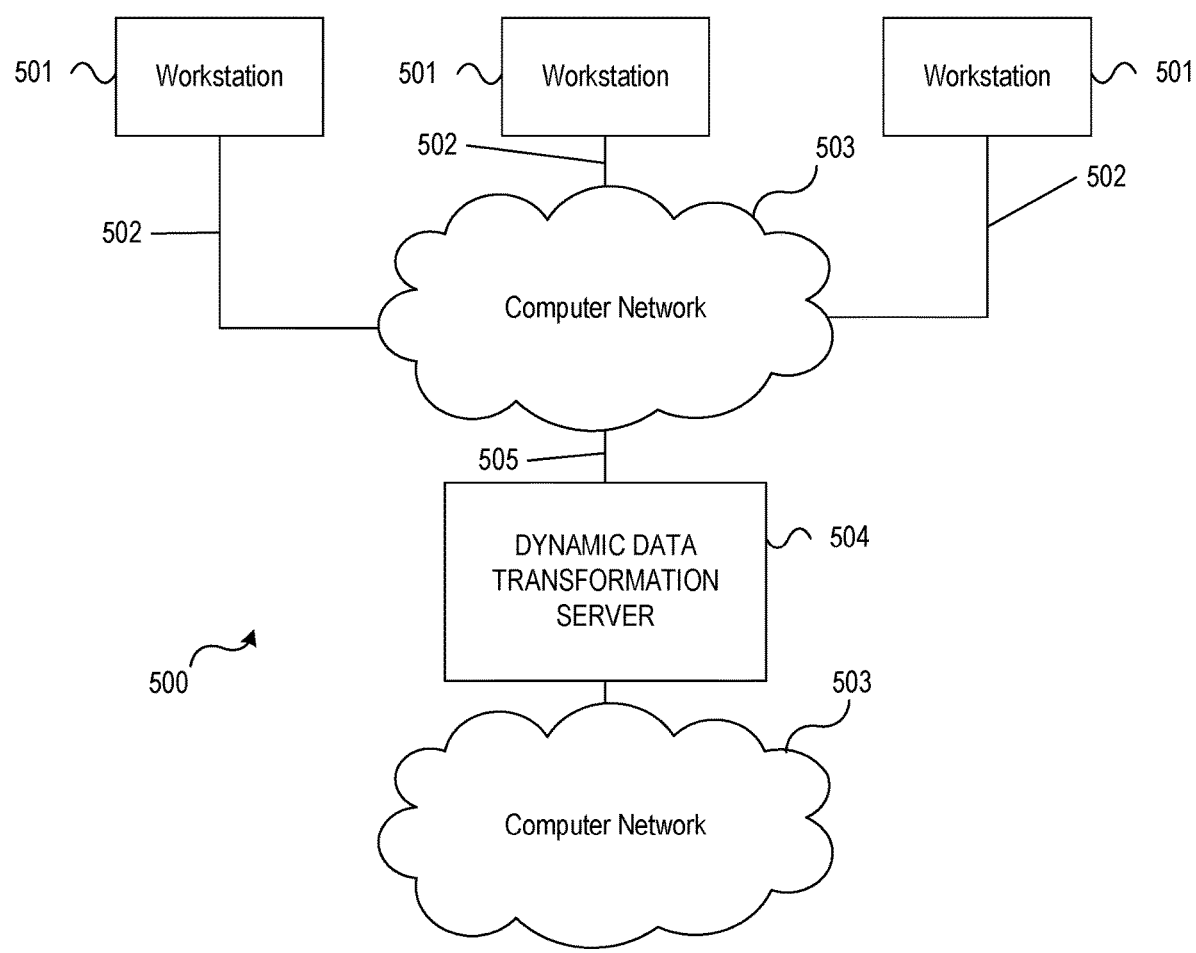
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to dynamic data transformation server 504. In system 500, dynamic data transformation server 504 may be a server, processor, computer, or data processing device, or combination of the same, configured to perform the functions and/or processes described herein. Server 504 may be used to receive data, ingest and process data, execute data governance functions such as data quality evaluations and data controls, transform data, publish data, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and dynamic data transformation server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive database data;
   execute a first process on the received database data, executing the first process including ingesting the received database data including writing the database data to the memory and executing first data governance functions on the received database data;
   after executing the first process, output first processed data;
   execute a second process on the first processed data, executing the second process including executing at least one dynamic data transformation on the first processed data and executing second data governance functions on the first processed data;
   after executing the second process, output second processed data; and
   execute a third process on the second processed data, executing the third process including publishing the second processed data to at least one downstream database.

2. The computing platform of claim 1, wherein executing the first process, second process and third process further includes capturing first data governance information, second data governance information and third data governance information, respectively.

3. The computing platform of claim 1, wherein the database data is received from a first type of database and wherein the at least one downstream database is a second type of database different from the first type of database.

4. The computing platform of claim 1, wherein the at least one data transformation includes at least one of: formatting the first processed data, executing a calculation on the first processed data and executing a derivation on the first processed data.

5. The computing platform of claim 1, wherein the first data governance functions and the second data governance functions each include at least one of: data quality evaluation functions or data controls.

6. The computing platform of claim 1, wherein the database data is received as batch data.

7. The computing platform of claim 1, wherein the received database data is relational database management system data.

8. A method, comprising:
   receiving, by a computing platform having at least a first processor and memory, database data;
   executing, by the computing platform, a first process on the received database data, executing the first process including ingesting the received database data including writing the database data to the memory and executing first data governance functions on the received database data;
   after executing the first process, outputting, by the computing platform, first processed data;
   executing, by the computing platform, a second process on the first processed data, executing the second process including executing at least one dynamic data transformation on the first processed data and executing second data governance functions on the first processed data;
   after executing the second process, outputting, by the computing platform, second processed data; and
   executing, by the computing platform, a third process on the second processed data, executing the third process including publishing the second processed data to at least one downstream database.

9. The method of claim 8, wherein executing the first process, second process and third process further includes capturing first data governance information, second data governance information and third data governance information, respectively.

10. The method of claim 8, wherein the database data is received from a first type of database and wherein the at least one downstream database is a second type of database different from the first type of database.

11. The method of claim 8, wherein the at least one data transformation includes at least one of: formatting the first processed data, executing a calculation on the first processed data and executing a derivation on the first processed data.

12. The method of claim 8, wherein the first data governance functions and the second data governance functions each include at least one of: data quality evaluation functions or data controls.

13. The method of claim 8, wherein the database data is received as batch data.

14. The method of claim 8, wherein the received database data is relational database management system data.

15. One or more non-transitory computer-readable media storing instructions that, when executed by a computing platform comprising at least one processor, memory, and a communication interface, cause the computing platform to:
receive database data;
execute a first process on the received database data, executing the first process including ingesting the received database data including writing the database data to the memory and executing first data governance functions on the received database data;
after executing the first process, output first processed data;
execute a second process on the first processed data, executing the second process including executing at least one dynamic data transformation on the first processed data and executing second data governance functions on the first processed data;
after executing the second process, output second processed data; and
execute a third process on the second processed data, executing the third process including publishing the second processed data to at least one downstream database.

16. The one or more non-transitory computer-readable media of claim 15, wherein executing the first process, second process and third process further includes capturing first data governance information, second data governance information and third data governance information, respectively.

17. The one or more non-transitory computer-readable media of claim 15, wherein the database data is received from a first type of database and wherein the at least one downstream database is a second type of database different from the first type of database.

18. The one or more non-transitory computer-readable media of claim 15, wherein the at least one data transformation includes at least one of: formatting the first processed data, executing a calculation on the first processed data and executing a derivation on the first processed data.

19. The one or more non-transitory computer-readable media of claim 15, wherein the first data governance functions and the second data governance functions each include at least one of: data quality evaluation functions or data controls.

20. The one or more non-transitory computer-readable media of claim 15, wherein the database data is received as batch data.

21. The one or more non-transitory computer-readable media of claim 15, wherein the received data is relational database management system data.

* * * * *